Nov. 4, 1952   R. G. MASON   2,616,205
FISHING LURE
Filed July 28, 1948

Inventor
ROLAND G. MASON

Attorney

Patented Nov. 4, 1952

2,616,205

UNITED STATES PATENT OFFICE 2,616,205

FISHING LURE

Roland G. Mason, Seattle, Wash.

Application July 28, 1948, Serial No. 41,060

1 Claim. (Cl. 43—42.23)

This invention relates to fishing lures, particularly fishing lures of the "plug" type, and is an improvement over the structure illustrated and described in my pending application for letters patent of the United States filed April 5, 1948, Ser. No. 19,069.

One of the features of said earlier plug as its provision of a tail-end hook attached to the plug by means of an elastic snood, and which serves the desirable end of allowing the hook to run out from the plug body in response to the force of a fish-strike. In consequence of the fact that the hook then occupies a position in remote trailing relation to the plug, the hooked fish is enabled to move with unusual freedom unhampered by any appreciable drag of the plug body. Moreover, this arrangement has the further and important advantage of safeguarding the destructive twist stresses which occur with the conventional type of rigging in which the hooks are held in close-coupled relation to the body of the lure.

My said prior plug, while it attains this desirable end insofar as tail-carried hook is concerned, makes no provision for the attachment of a belly hook, and it is a particular object of the present invention to devise a plug having both the belly and tail-end hooks and peculiarized in that both said hooks are attached to the body of the lure by an elastic snood. The invention has the further object of providing a plug of this character in which there is employed a single snood common to both hooks and entirely unattached to the plug body, and which has the important advantage, as distinguished from the internal anchoring of the snood in my said prior plug, of exposing both ends of the snood. This exposure of both ends makes for unusual ease of replacement where, after long usage, the snood may lose its elasticity or become otherwise defective and consequently require that the plug be rigged with a new snood.

The present plug, as with my prior lure, embodies a swivel mounting at the head end, and it is a further object of the present invention to engineer the plug in a manner permitting the swivel axis to be shifted longitudinally of the plug to vary the action in compensation of physical variables in the body of water which is being fished, and namely tide, current and the like.

The invention has the further object still of providing a weed-guard located to occupy a position at the head end of the plug and functioning to minimize plug-fouling by its diversion of sea-weed and other similar foreign matters with which the plug may come in contact in its passage through the water.

With the foregoing and other still more particular objects and advantages in view and which will appear and be understood in the course of the following description and claim, the invention consists in the novel construction and in the adaptation and combination of parts hereinafter described and claimed.

Figure 1:
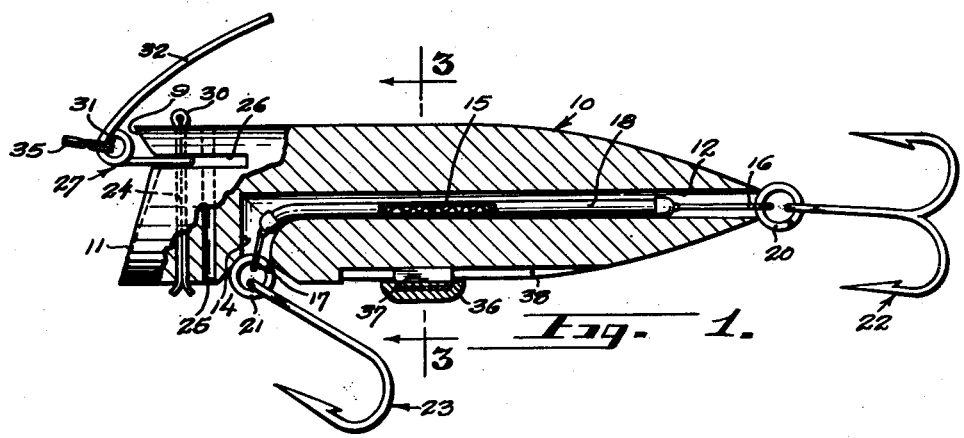
Figure 1 is a view partly in side elevation and partly in longitudinal vertical section illustrating a fishing plug constructed in accordance with the now-preferred embodiment of the present invention.
Figure 2:
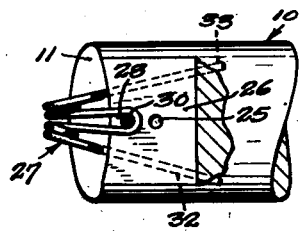
Fig. 2 is a fragmentary view detailing the front end thereof and shown partly in top plan and partly in horizontal section.
Figure 3:
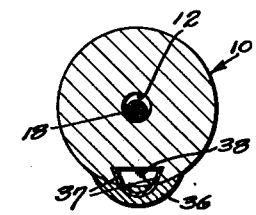
Fig. 3 is a transverse vertical section on line 3—3 of Fig. 1.
Figure 4:
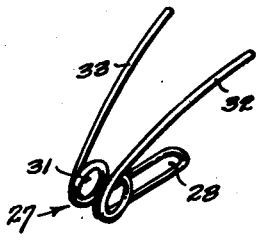
Fig. 4 is a perspective view showing the swingle-mounted draw-bar which is applied to the present plug.

The body of my plug, and which I denote generally by the numeral 10, is produced from any suitable material, wood by preference, and is desirably made cylindrical throughout the greater portion of the length with the tail end being tapered and having the front end cut diagonally to present a sloping face 11 interrupted at the upper edge by an overhang 9. The sloping face is or my be slightly dished.

According to the present invention, the plug is drilled from the tail end to provide a bore 12 which desirably extends for somewhat more than half the length of the plug. To connect with this bore the plug also provides a bore 14 drilled upwardly from the belly. There is received within the connecting bores 12 and 14 an elastic snood composed of a coiled length of fish twine 15 encased in a sleeve 18 of gum rubber or functionally equivalent material, and attached to the two ends of this twine are respective swivel-eyes, as 16 and 17. The length of the elastic sleeve, when in its normal contracted condition, very nearly approximates or in fact may exceed the over-all length of the two bores 12 and 14, and there is connected to the two swivel-eyes a respective ring, as 20 and 21, sized such as to preclude their passage through the bores. Each of the two rings 20 and 21 connects with the shank of respective gang-hooks designated by 22 and 23.

Figure 5:
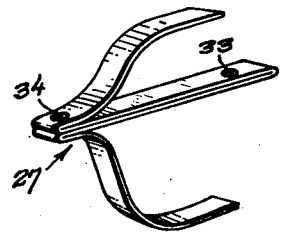
Fig. 5 is a perspective view illustrating a modified draw-bar structure.

Drilled vertically through the head end of the plug are two longitudinally spaced holes 24 and 25, and extending rearwardly from the frontal face of the plug on a plane offset above the plug's vertical center is a horizontal slot 26 of sufficient depth to traverse both of these holes. A draw-bar 27 is inserted in this slot and presents upon its inner end an eye 28 arranged to be brought into registration with either of the two drill-holes 24 or 25, selectively, and there is received through the selected drill-hole to engage said draw-bar a cotter or other like swivel-pin 30. In forming the draw-bar I desirably employ a length of wire which is bent back upon itself intermediate the ends, thus to produce the terminal eye, and the two branches are then brought together at a point more or less central to the lengths and looped to collectively produce a second eye 31 having its axis placed at right angles to the axis of the terminal eye. From this central eye, the free ends of the two branches are given an incurved shape and overhang the head end of the plug by extending upwardly and thence rearwardly much in the nature of antler-like flooks 32—33. The purpose of the flooks is to shield the plug body against liability of becoming fouled by sea-weed, reeds and the like encountered in the body of water being fished, and the flooks may, if desired, extend top and bottom from the central eye 31 and carry therefrom into underlying relation to the bottom side as well as the top side of the plug's head end. I have illustrated in Fig. 5 a modified draw-bar so formed as to serve this end, such modified structure showing the draw-bar as being produced from strap metal rather than wire, and with the two eyes 33 and 34 which, in point of function, correspond to the eyes 28 and 31, respectively, being punched through the metal of the strap. Should it be desired, the draw-bar proper of the strap-metal embodiment can be punched to provide two rather than a single said eye 33 and which would give a finer adjustment of the plug's swivel action by permitting either of two eyes to be brought into registration with either of the two drill-holes. Denoted 35 is a ring which engages through the eye 31 or the eye 34, as the case may be, and accommodates the attachment of a fishing line through the medium of the usual swivel fitting.

Arranged and adapted to be applied to the belly of my plug and made longitudinally adjustable with respect thereto is a weighing slug 36. This slug is desirably molded from lead and has a crescent shape in cross section to conform more or less closely to the surface contour of the plug. A pair of spring prongs 37 are integrated with the slug and extend divergingly from the concave face thereof, and these prongs operate to anchor the weighting slug by frictionally bearing against the side walls of a dove-tail surface groove 38 cut in the belly of the plug.

It is thought that the invention will have been clearly understood from the foregoing detailed description of my now preferred embodiment. Irrespective of whether a fish striking the lure is caught by either the tail or the belly hooks, or both, the elasticity of the snood permits the hook to run out from the body of the lure and isolates the latter against transmittal of destructive twist forces.

Minor changes in the details of construction may be made without departing from the spirit of the invention, and I intend that the hereto annexed claim be given a scope fully commensurate with the broadest interpretation which the employed language fairly permits.

What I claim is:

In a fish lure, the combination of a plug body having its head end horizontally slotted and providing longitudinally-spaced vertical drill-holes traversing said slot, a draw-bar adapted to connect by its front end with a fishing line and having an apertured rear end received in the slot, and a pin adapted to be applied through a selected said drill-hole to engage in the aperture of the draw-bar and serving as a swivel mounting for the latter.

ROLAND G. MASON.

REFERENCES CITED

The following references are of record in the file of this patent:

UNITED STATES PATENTS

| Number | Name | Date |
|---|---|---|
| 731,788 | Kleinschmidt | June 23, 1903 |
| 994,374 | Childs | June 6, 1911 |
| 1,114,137 | Heddon | Oct. 20, 1914 |
| 1,209,022 | Phinney | Dec. 19, 1916 |
| 1,242,556 | Jay | Oct. 9, 1917 |
| 1,376,590 | Stolley | May 3, 1921 |
| 1,299,975 | Ford | July 1, 1924 |
| 1,535,957 | Stanley | Apr. 28, 1925 |
| 2,079,883 | Valasek | May 11, 1937 |
| 2,162,049 | Baker | Jan. 13, 1939 |
| 2,176,250 | DeLong | Oct. 17, 1939 |
| 2,239,802 | Westby | Apr. 29, 1941 |
| 2,275,253 | Eger | Mar. 3, 1942 |
| 2,335,322 | Taylor | Nov. 30, 1943 |
| 2,459,288 | Robbins et al. | Jan. 18, 1949 |
| 2,484,747 | Russell | Oct. 11, 1949 |
| 2,512,836 | Olson et al. | June 27, 1950 |